United States Patent
Robinson et al.

(10) Patent No.: US 6,650,377 B2
(45) Date of Patent: Nov. 18, 2003

(54) TWO PANEL PROJECTION SYSTEMS (75) Inventors: Michael G. Robinson, Boulder, CO (US); Gary D. Sharp, Boulder, CO (US)

(73) Assignee: ColorLink, Inc., Boulder, CO (US)

( * ) Notice: Subject to any disclaimer, the term of this patent is extended or adjusted under 35 U.S.C. 154(b) by 186 days.

(21) Appl. No.: 09/779,443

(22) Filed: Feb. 9, 2001

(65) Prior Publication Data

US 2002/0027619 A1 Mar. 7, 2002

Related U.S. Application Data (60) Provisional application No. 60/202,874, filed on May 8, 2000.

(51) Int. Cl.[7] ............................................. G02F 1/1335
(52) U.S. Cl. .................................. 349/9; 349/8; 353/34
(58) Field of Search ....................... 349/5, 8, 9; 353/30, 353/34

(56) References Cited

U.S. PATENT DOCUMENTS

| | | | |
|---|---|---|---|
| 5,534,949 A | 7/1996 | Baron | 348/742 |
| 5,751,384 A | 5/1998 | Sharp | 349/18 |
| 6,217,174 B1 | 4/2001 | Knox | 353/31 |
| 6,280,034 B1 * | 8/2001 | Brennesholtz | 353/20 |
| 6,388,718 B1 * | 5/2002 | Yoo et al. | 349/9 |
| 6,390,626 B2 * | 5/2002 | Knox | 353/20 |
| 6,419,362 B1 | 7/2002 | Ikeda et al. | |

* cited by examiner

*Primary Examiner*—Robert H. Kim
*Assistant Examiner*—Andrew Schechter
(74) *Attorney, Agent, or Firm*—Baker & McKenzie (57) ABSTRACT

An apparatus that includes a first panel that receives image information for a first color, a second panel that receives image information for a second color and a third color, a temporal modulator and polarizing unit that receives light that includes a first color light, a second color light, and a third color light, and passes either said first color light and said second color light or said first color light and said third color light, and a single beamsplitting and combining device for directing said first color light to said first panel and said second or third color light to said second panel.

69 Claims, 3 Drawing Sheets

TWO PANEL PROJECTION SYSTEMS

This application claims priority to Provisional Application No. 60/202,874, filed May 8, 2000. Incorporation by reference of the entire disclosure of that provisional application is considered as being part of the disclosure of the accompanying application and is hereby incorporated by reference therein.

BACKGROUND OF THE INVENTION

1. Field of the Invention

The present invention relates to a two panel projection system used in a projection type display.

2. Background of the Related Art

Two panel systems represent an attractive compromise between three panel systems and one panel systems. Three panel systems have high brightness, but also have a high component count. Single panel systems are simplest (no panel alignment, and low component count), but have reduced luminance and potential for color artifacts.

Single panel projection systems are being realized using Texas Instruments digital light processing (DLP) technology (see U.S. Pat. No. 5,612,753), which use a rotating color wheel to time sequence the primary illumination colors. Full color images are produced by sequentially projecting primary colored frames, that when viewed, are temporally integrated by the eye. The color wheel is unattractive relative to solid-state color shutters, but are used presently with the DLP technology due to its polarization insensitivity. Inexpensive single liquid crystal on silicon (LCOS) panels are beginning to be used to implement time sequential systems, which use polarized light and are well matched to liquid crystal based dynamic polarization modulation. Although these single panel systems are small and lightweight (and ultimately very inexpensive), they are intrinsically less efficient than the three panel approaches because two thirds of the light is blocked at any instant. These single panel systems also require high frame rates to avoid color breakup. Although the minimum field rate is 150–180 Hz, artifact mitigation may push field rates up by three times, or more.

Three panel systems employ architectures that split light into three spatially separate primary colored beams, which in turn illuminate three separate panels by two color splitting operations. The light emanating from the panels is then recombined and projected to form a full color image. These systems are the most common at the present time as they are very efficient and do not suffer from breakup, despite having video or sub-video refresh rates. However, the two color splitting operations required to split the light into three separate beams result in a bulky system size and a high component count, leading to higher cost and weight.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

In the present invention, a two panel projection system is implemented without significantly increasing the component count over a single panel projection system. The two panel system of the present invention utilizes a single splitting/combining Polarizing Beam Splitter (PBS), where colors are encoded with polarization both dynamically and passively. The design of the present invention thus maintains the back-focal length of a single panel system, and simply places an additional panel at a port normally discarded in a single panel system. Color break-up and LCD frame-rate are reduced in the present invention relative to that of a single panel system. In a preferred embodiment, a color-balanced system is used which has a brightness much closer to a three panel system than a single panel system. The invention relates primarily, but not exclusively, to reflective liquid crystal on silicon (LCOS) micro-display technology.

In the present invention, two panel hybrid split-path sequential architectures are used. In the present invention, the problems of the one and three panel systems are present to some degree, but the extent to which these problems are observed is significantly reduced compared to either one individually, while still benefitting from aspects of the one and three panel systems. For example, the component count of the two panel system of the present invention is not significantly greater than a single panel system, and substantially less than a three panel system. The two panels each reside directly adjacent to the PBS, and therefore the two panel system has the same back-focal-length as a single panel system, which reduces projection lens cost. The frame rates necessary for good image quality can also be significantly lower than that required for the single panel system, reducing performance demands and cost of the panel. The throughput is at least the average of that obtained by the single and three panel systems, and by considering the correction to the transmitted color coordinates, the throughput of a two panel system can be surprisingly close to that of a three panel system. This is particularly so for a television projection system, where correct color balance and reduced color temperature can force significant green attenuation.

Two panel systems have been realized with DLP technology, but require using both color and input/output beam separation optical elements, thus making the overall two panel DLP optical system unattractive. The concept behind the present invention is to use a single splitting and combining element, or a Polarized Beam Splitter (PBS), with two liquid crystal panels to realize a low cost, compact, high-performance system. Retarder stack based filters or other temporal modulators in conjunction with the PBS of the present invention enable this approach.

To achieve the above objects of the present invention in whole or in parts, there is provided an apparatus that includes a first reflecting panel that receives image information for a first color, a second reflecting panel that receives image information for a second color and a third color, a temporal modulator that receives and modulates light that includes a first color light, a second color light, and a third color light, and a beamsplitting and combining element having a single reflecting/transmitting surface that reflects and transmits the first color light to the first panel and the second and third color light to the second panel and combines images reflected from the first reflecting panel and the second reflecting panel.

To further achieve the above objects of the present invention in whole or in parts, there is provided an apparatus that includes a first transmissive panel that receives image information for a first color, a second transmissive panel that receives image information for a second color and a third color, a temporal modulator that receives and modulates light that includes a first color light, a second color light, and a third color light, and a beamsplitting and combining element having two reflecting/transmitting surfaces, one for reflecting or transmitting at least the first color light to the first panel, and a second one for reflecting or transmitting the second and third color light to the second panel, the beamsplitting and combining element further combines images from the first transmissive panel and the second transmissive panel.

To further achieve the above objects of the present invention in whole or in parts, there is provided an apparatus that includes a first panel that receives image information for a first color, a second panel that receives image information for a second color and a third color, a temporal modulator and polarizer unit that receives light that includes a first color light, a second color light, and a third color light, and passes either the first color light and the second color light or the first color light and the third color light, and a single beamsplitting and combining device for directing the first color light to the first panel and the second or third color light to the second panel.

To further achieve the above objects of the present invention in whole or in parts, there is provided an apparatus that includes a first panel that receives at least a first color light and outputs a first color image, a sequential panel that sequentially receives a second color light and a third color light and sequentially outputs a second color image and a third color image, a temporal modulator that receives and modulates light that includes the first color light, the second color light and the third color light, a beamsplitter optically coupled to the temporal modulator, wherein the beamsplitter receives the light and directs at least the first color light to the first panel and the second color light and the third color light to the sequential panel, wherein the beamsplitter further sequentially outputs the second color light and the third color light to the sequential panel to yield the second color image and the third color image, and wherein the beamsplitter combines the first color image with the second color image or the third color image, wherein the first panel, the sequential panel, and the temporal modulator operate cooperatively to yield a full color image to an observer.

To further achieve the above objects of the present invention in whole or in parts, there is provided a method for projecting a full color display from a two panel system that includes directing a light beam to a temporal modulator, temporally modulating colors in the light beam, splitting the light beam into a first color light beam and a second color light beam, illuminating a first panel with at least the first color light beam, illuminating a second panel with the second or third color light beam, receiving and recombining light emitted from the illumination of the first and the second panels, and directing the recombined light through a projection lens.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
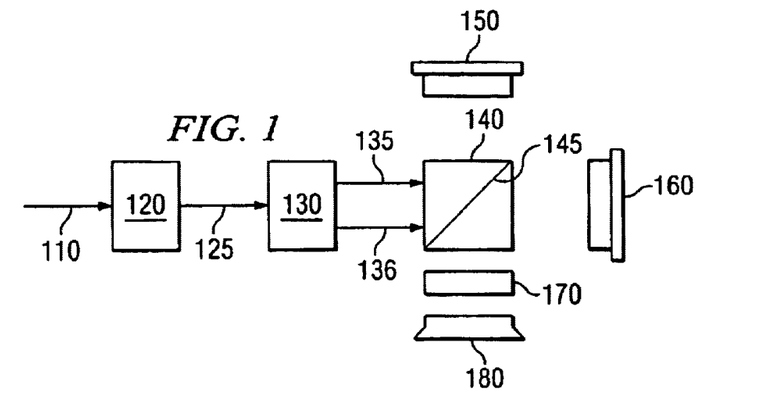
FIG. 1 is a diagram that illustrates a first preferred embodiment of a two panel full color projection system in accordance with the present invention.

FIG. 1 is a diagram that illustrates a first preferred embodiment of a two panel full color projection system in accordance with the present invention. The first preferred embodiment includes a temporal modulator 120, at least one polarizer 130, with an optional second polarizer 170, a single beamsplitting and combining device 140, two panels 150, 160 and a projection lens 180. The temporal modulator 120 and filters 130, 170 according to one embodiment of the invention are described in U.S. Pat. Nos. 5,751,384; 5,953,083; 5,990,996; 5,999,240; 5,929,946; 6,049,367; 5,658,490; 6,046,786; 6,078,374; 5,619,355; 5,132,826; 5,243,455; 5,231,521; 5,528,393; 6,091,462; 5,892,559; 5,822,021; 5,767,828; 5,959,598; 6,040,883; 5,868,951; 5,919,606; 5,870,159; and U.S. paten Ser. Nos. 09/362,954; 09/241,400; 09/126,330; 09/165,127; 09/362,497; 09/190,273; 09/311,587; 09/570,548; 09/362,496; 09/362,499; 09/466,053; 09/410,098; 08/949,692; 08/823,875; 09/119,976; 09/119,975; 09/209,241; the contents of which are incorporated herein by reference. Panel 150 can be referred to as a sequential panel since it sequentially provides images for two different colors or more generally spectra of light. It should be understood that sequentially does not necessarily mean alternatively but instead could encompass displaying images of one color more than once followed by the other color. A white light 110 enters the system incident on the temporal modulator 120, which selectively polarizes selected spectral components of light 125. The first filter 130 then rotates the polarization of a first spectral component 135 from within the originally polarized spectral components of light 125 while not rotating a second spectral component 136 which remains with the remainder of the originally polarized spectral component 125. The polarized first and second spectral components 135, 136 are then separated by a single reflecting/transmitting surface 145 of a beamsplitter 140, where the first and second spectral components 135, 136 each separately illuminates each the two panels 150, 160, respectively. The panel comprises pixels which are externally controlled to produce the final image and can be either ON or OFF. The pixels that are ON allow illumination of the pixel by the spectral component shown on the panel. The pixels that are OFF are not illuminated by the spectral component shown on the panel. Those pixels that are ON also rotate the polarization of the illumination of the panel by $\pi/2$ in a round-trip, and this light from the illumination of the panel is returned to the single reflecting/transmitting surface 145 of the beamsplitter 140 to be recombined with the light from the illumination of the other panel. The previously rotated first spectral component 135 may have its polarization rotated by an optional second polarizer 170 before both recombined lights from the illuminated two panels 150, 160 are displayed through the projection lens 180.

The preferred temporal modulating devices are stacks which use the technology described in U.S. Pat. No. 5,990,996, but can potentially use the stacks described in U.S. Pat. No. 5,751,384. The temporal modulator can also be a unit which includes both a temporal modulator and a polarizer. The stacks can also be replaced by other temporal modulating devices such as a rotating color filter wheel or a modulator using DLP technology. Here a stack includes any layered material that manipulates the polarization of at least some wavelengths of light passing through it. It includes but is not necessarily limited to stacks as defined in U.S. Pat. Nos. 5,751,384; 5,990,996; 5,999,240; 5,929,946 and 6,049,367; and U.S. patent Ser. Nos. 09/126,330; 09/165,127; 09/362,497 and 09/754,091. The stacks, as defined in the above patents and patent applications, include form-birefringence devices, polymer films, liquid crystal polymer films, stretched polymer retarder sheets, and crystalline retarders to name a few. Additionally, stacks may be active or passive. Active stacks are stacks which have any active device incorporated therein. Passive stacks on the other hand, do not have any active devices included in the stack.

The preferred filters are passive polarizing filters. Passive polarizing filters are often used to consistently rotate polarized light to a specific direction, filter white light to polarize the light in its entirety (which can increase the overall contrast or brightness or can improve the saturation of the base colors), or to filter only light particular to a specific spectral component (which can "clean up" the polarization of the spectral component's transmission of complementary colors). When filtering white light to polarize the light in its entirety, the filter is also called an achromatic polarizer. When filtering only light particular to a specific spectral component, the filter is called a chromatic polarizer.

Figure 2:
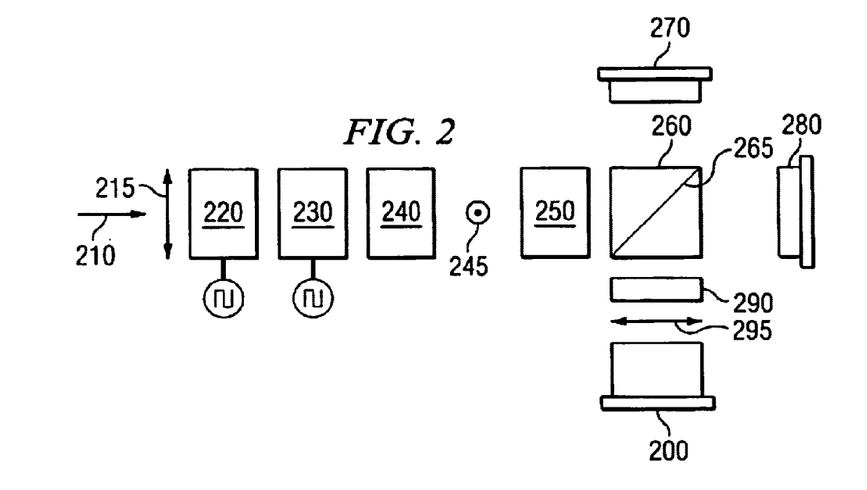
FIG. 2 is a diagram that illustrates a second preferred embodiment of a two panel full color projection system in accordance with the present invention with three filters and a two stage dynamic temporal modulator.

FIG. 2 is a diagram that illustrates a second embodiment of the present invention. The second embodiment includes two temporal modulators 220, 230, three polarizing filters 240, 250, 290, a single beamsplitter and combiner 260, two panels 270, 280 and a projection lens 200.

White light 210, which is polarized by an achromatic or neutral polarizer 215, enters the system from the left and is incident on the two temporal modulators 220, 230. Each modulator in this embodiment is dynamic, in that each has active control of the modulation of light. Here each dynamic temporal modulator, which can be an active stack or any other temporal modulator with active control over the modulation of light, provides analog voltage controlled rotation of the polarization of an additive primary (for example, blue and/or green). The third primary (for example, red) is passively rotated by a filter 240 to an orthogonal polarization. A neutral polarization analyzer 245 can be used to block certain light such as light not rotated by the modulators. In the specific case shown above, the four extreme output states are therefore Red+Blue (i.e. Magenta), Red+Green (i.e. Yellow), Red, and White. A white state permits the addition of a white frame if desired to further increase brightness.

The transmitted light then passes though a second filter 250 that rotates the polarization of the third primary (red) only. The orthogonally polarized spectral components are then separated by a polarizing beamsplitter 260 into the additive primary (blue and/or green) and the third primary and each of the spectral components, blue and/or green or red illuminates one of the two panels 270, 280. Similar to the first embodiment, the panel pixels that are ON rotate the polarization by $\pi/2$ in a round-trip, and this light is returned to the beamsplitter 260 to be recombined with the other spectral component. ON state light is directed toward a projection lens 200, and OFF-state light is returned counter to the illumination light. In order to avoid leakage of P polarized red light (reflected from OFF or black pixels) in the above system, a further Red/Cyan polarizing filter 290 is placed at the output, which rotates the polarization of the red light to S polarization. A clean-up polarizer 295 then absorbs the leakage and a high contrast image is projected onto a screen by the projection lens.

A particularly simple stack design operates in subtractive mode, meaning that the input polarization and the output polarization are the same. In this configuration, red (wherein red is merely exemplary and may be blue, green or any other color) is always passed, and two active stack stages alternatively and actively block blue and green (the complementary colors of red). An all-pass state occurs when both stages are activated to pass the blue and green (stack-only white). During transitions between blue and green fields, where there may occur a significant panel load and settle time, it may be necessary to block illumination. In this case, an interval of 0.5–1.5 milliseconds of red only (where blue and green are both blocked) may be required for the transition between the blue and green fields. One solution is to combine a fast switching black/white shutter with a subtractive stack to blank illumination. Alternatively, it may be preferred to operate the fast switching shutter in an additive mode.

In additive mode, output light from the stack is polarized orthogonal to the input. When both cells are energized and a stack-only neutral design is used, very low transmission of blue and green light occurs. Conversely, subtractive mode leakage of inter-primary light (true-cyan) can degrade contrast and color quality. While additive mode gives good color quality and contrast, a passive polarizing filter (i.e. R/C) is needed after the stack in order to polarize red orthogonal to the blue/green polarization.

In FIG. 2, a passive or chromatic polarizing filter, or in this example of the second preferred embodiment, a red (wherein red is merely an exemplary color, blue, green or any other color may be substituted) rotator 250 may lie between one of the dynamic temporal modulators 220, 230 and the PBS 260 with a single reflecting/transmitting surface 265. The red rotator 250 may then be used in a complementary mode, determining which portion of the spectrum enters each liquid crystal display (LCD) port 270, 280. In a preferred embodiment, P-polarized red light is introduced to the PBS, minimizing blue/green leak into the red port. Since the proportion of off-state S-polarized light at the output is relatively small, only primary red is converted to P-polarization. In particular, the yellow portion of the spectrum remains S-polarized. The dynamic range should be high (200:1) for this red rotator, particularly in preserving the polarization of green light.

P-leakage of red light into the blue/green port must be eliminated at the output using a passive clean up structure. However, cooperation between input and output red rotators has additional functionality. An additional red rotator 290 is used both to improve contrast ratio and color gamut. In the true white state (assuming an achromatic LCD), blue, green, as well as true cyan and true yellow, are converted to P-polarization. Red is converted to S-polarization. Color enhancement is accomplished with the additional red rotator 290 by rotating red to P-polarization 295, while a significant portion of true yellow is rotated to S-polarization. In this way, absorption at the clean-up polarizer creates a notch in the yellow portion of the spectrum. Since the additional red rotator 290 acts on both yellow and red, it has an orange appearance, with transition band blue shifted relative to the red rotator 250. The separation of half-power points between the red rotator 250 and the additional red rotator 290 can vary from 10–30 nm, depending on the tradeoff between color gamut and luminance. As with the additional red rotator 290, the dynamic range should be high, particularly in rotating red/yellow.

The specification for red rotator 250 in the above architecture is difficult to achieve relative to the other red rotator elements. It must produce primary red, and is operated in a complementary mode. Alternatively, S-polarization can be introduced to the color switch, which means that the analyzer is P-oriented.

Figure 3:
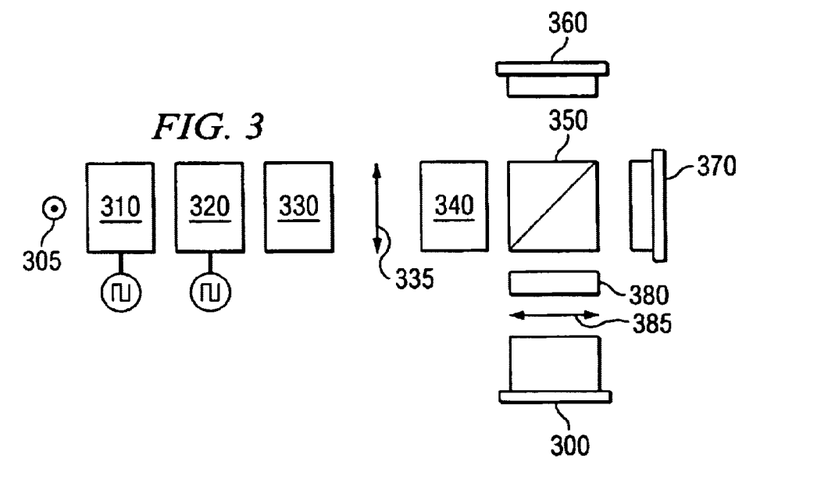
FIG. 3 is a diagram that illustrates a third preferred embodiment of a two panel full color projection system in accordance with the present invention.

FIG. 3 is a diagram that illustrates a third preferred embodiment of a two panel full color projection system in accordance with the present invention. Similar to the second embodiment, the third preferred embodiment includes two dynamic temporal modulators 310, 320, three chromatic polarizers 330, 340, 380, two achromatic polarizers 305 and 385, a PBS 350, two panels 360, 370, a neutral polarization analyzer 335, and a projection lens 300, wherein the components act in the same manner as that of the second embodiment, except that S-polarization is introduced, which means the analyzer 335 is P-oriented.

A passive polarizing filter stack 340 which may be, for example, a cyan/red filter, C/R is used to rotate the inverse of a primary color, for example, red, to S-polarization. This stack is a passive stack composed of films that are fundamentally substantially full-wave retarders in the red, rather than half-wave. For the latter, the design is simplified by designing with half-wave red retarders (roughly 470 nm), and selecting the design with multiple "doubles". Since a 940 nm retardation can be fabricated in a single film, doubles can significantly reduce the total number of films. This is particularly so for a 50:50 duty ratio design, which has only one 470 nm film, and the remainder are 940 nm films. Alternatively, a full-wave red retarder may produce similar performance with a reduced number of films.

The above embodiment is robust, provides high contrast, and a wide color gamut, though there are a number of simplifications that can potentially be made to reduce cost and complexity.

Figure 4:
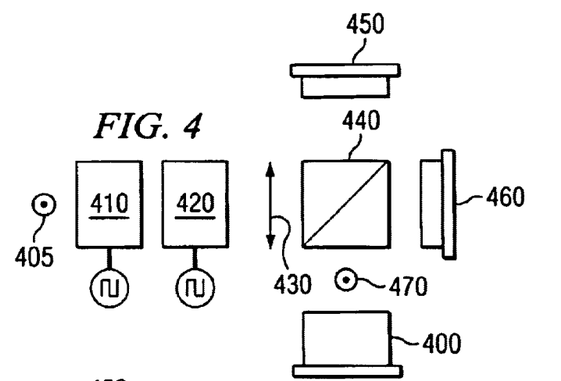
FIGS. 4 and 4a are diagrams that illustrate a fourth preferred embodiment and an alternative fourth preferred embodiment of a two panel full color projection system in accordance with the present invention.

In FIG. 4, a fourth embodiment of the present invention is illustrated. White light is polarized by a neutral polarizer 405 to an S-polarization, which is input to two dynamic temporal modulators 410, 420, where the S-polarization is analyzed by a passive red dye polarizer 430 with P-transmission. The two passive filters 330, 340 and the analyzer 335 in the third preferred embodiment are replaced in the fourth embodiment by a single passive red dye color polarizer 430. The single passive red dye polarizer 430 is isotropic in the red spectrum and acts as a polarizer in the blue/green spectrum. If P-Polarized red light is introduced to the PBS 440, then the clean up structure may have a polarizer 470 with high polarizing efficiency in the red. While red dye polarizers often perform quite well, other colored dye polarizers can be used. However, cyan dye polarizers, for example, can often have very poor transmission, polarizing efficiency, and chromatic properties but may still be used.

Blue/green P-leakage in the fourth embodiment may be cleaned up using a passive red dye polarizer 470 with S-transmission at the output port, thus replacing the clean up structure 380, 385 of the third embodiment. This design has a small number of retarder layers, but acceptable contrast and red coordinate requires that the polarization of blue/green light be preserved during transit of the PBS 440 in the off-state. If so, the high efficiency of the crossed dye polarizers insures high contrast. The contrast ratio of red light is determined by the PBS alone, requiring that red light be introduced to the PBS S-polarized. Note that a red dye clean-up polarizer can be used with any input structure, provided that blue/green are introduced to the PBS P-polarized.

Figure 4A:
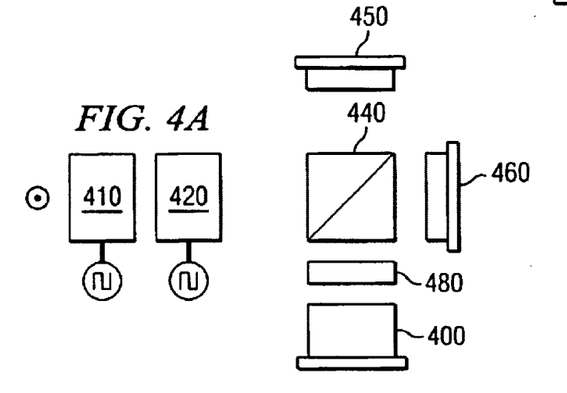

An alternative to the above system, FIG. 4a illustrates an alternative embodiment of the fourth embodiment of the present invention which omits the input red dye polarizer of FIG. 4 entirely. The discarded light (blue in the green state, green in the blue state, and cyan in the black state) is therefore incident on a red panel 450. This light is absorbed by an output red dye polarizer 480, which takes on the dual roll of clean-up, and filter analyzer. This architecture places the greatest performance demand on the remaining components. For instance, the polarization purity of light exiting the color switch must be quite high in order to maintain contrast ratio. This alternative system is particularly suitable for use with Mercury ultra-high pressure (UHP) sources in which the source is red deficient, although systems similar in concept can be realized that use alternative light sources. In these cases, an alternative permanent illumination color can be chosen and managed with suitable dynamic temporal modulators and passive polarizing filters. In these systems, the color saturation is determined by the filter bands of both the dynamic temporal modulators and passive polarizers. In the case of the system above designed primarily for use with a UHP source, unwanted yellow light can be notched out to achieve the required color gamut. For efficient notching it is normally necessary to have steep transitions in the color filter spectra. In this case, the notching can be part achieved by the dynamic temporal modulator, and part by a mismatch between passive polarizing filters.

Effectively, the overall filtering is a product of the two filtering functions by the dynamic temporal modulator and the passive polarizing filters. In practice this may mean that a fewer number of films are required in the polarizing filter make-up and hence cost is reduced.

Two stage systems as required by the present invention, are also significantly easier to design and build as compared with the conventional three stage. In the particular two stage systems above with two colors actively modulated and the third color filtered, issues concerning field of view and complexity are significantly reduced relative to three panel systems where three colors are actively modulated. For instance, a third dynamic modulator which is required in a conventional three stage system has a significantly higher number of films than a passive filter of a two stage system. In addition, rapid switching of the third color, for example, may call for two dynamic temporal modulators for the third color in a full-color system, where the two panel system has no third color dynamic temporal modulator.

One further advantage of the present invention relates to the reduced frame rate of a two panel system compared to a single panel system. Based on color artifact considerations, it is widely believed that single panel systems must operate at a 360 Hz field rate or higher. Using typical nematic LC relaxation times, a significant fraction of the 2.8 milliseconds can be consumed with dark-state load/settling of the panel. This renders the efficiency of the single panel system unacceptable.

In a two panel system of the present invention, the field rate of the sequential panel is fundamentally 120 Hz, much slower than that of a single panel, because the additive primary, for example, red, is not operated sequentially with the other primaries, for example blue and green, therefore the field rate need not triple as required in the single panel system which sequences all three colors including the additive primary. In the two panel system, the efficiency loss of a nematic panel due to settling time is not prohibitive. Because nematic-based panels are likely to be relatively inexpensive (compared to DLP or ferroelectric liquid crystal), the two panel architecture is believed to be more cost effective.

Figure 5:
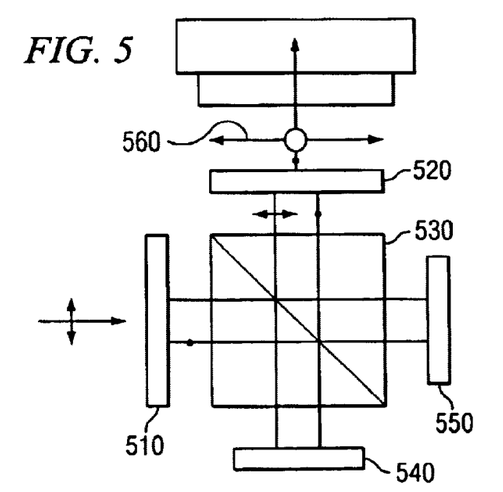
FIG. 5 is a diagram that illustrates a fifth preferred embodiment of a two panel full color projection system in accordance with the present invention.

FIG. 5 is a diagram that illustrates a fifth preferred embodiment of a two panel full color projection system in accordance with the present invention. In this embodiment, dynamic switches 510, 520 are on either side of the PBS 530, and can allow all the light (barring any notched parts of the complete source spectrum) to be available for projection at any one time. In this embodiment, polarized light is incident on a three stage dynamic temporal modulator 510 which rotates the polarization of each of the primary colors in turn while retaining the polarization of the corresponding complementary color. This color encoded polarized beam is then split by a PBS such that at any one time a first panel 540 sees a primary color and a second panel 550 sees the complementary color. By time sequencing through the primary colors, it is possible to supply information to form a full color image. The reflected light used to form the image is altered in polarization by the panels and is recombined by the PBS. Again, stray P-polarized light may be cleaned up. This is done using a second dynamic temporal modulator 520 working in synchronization with the first to rotate the primary color band incident at any one time on the lower panel back to that of its complementary color. A polarizer 560 then transmits this light and rejects the unwanted P reflection from the second panel 550 as before.

As stated above, this system has the advantage of potentially using all of the light to form white objects in the image, thus reducing color break-up artifacts and having near maximal throughput. As a consequence of this, however, the intensity of a primary colored object within the image would be one third as bright as that projected by an equivalently bright image from a three panel system. In other words, the brightness of the projected white would not be the sum of the brightness of the projected primaries.

Figure 6:
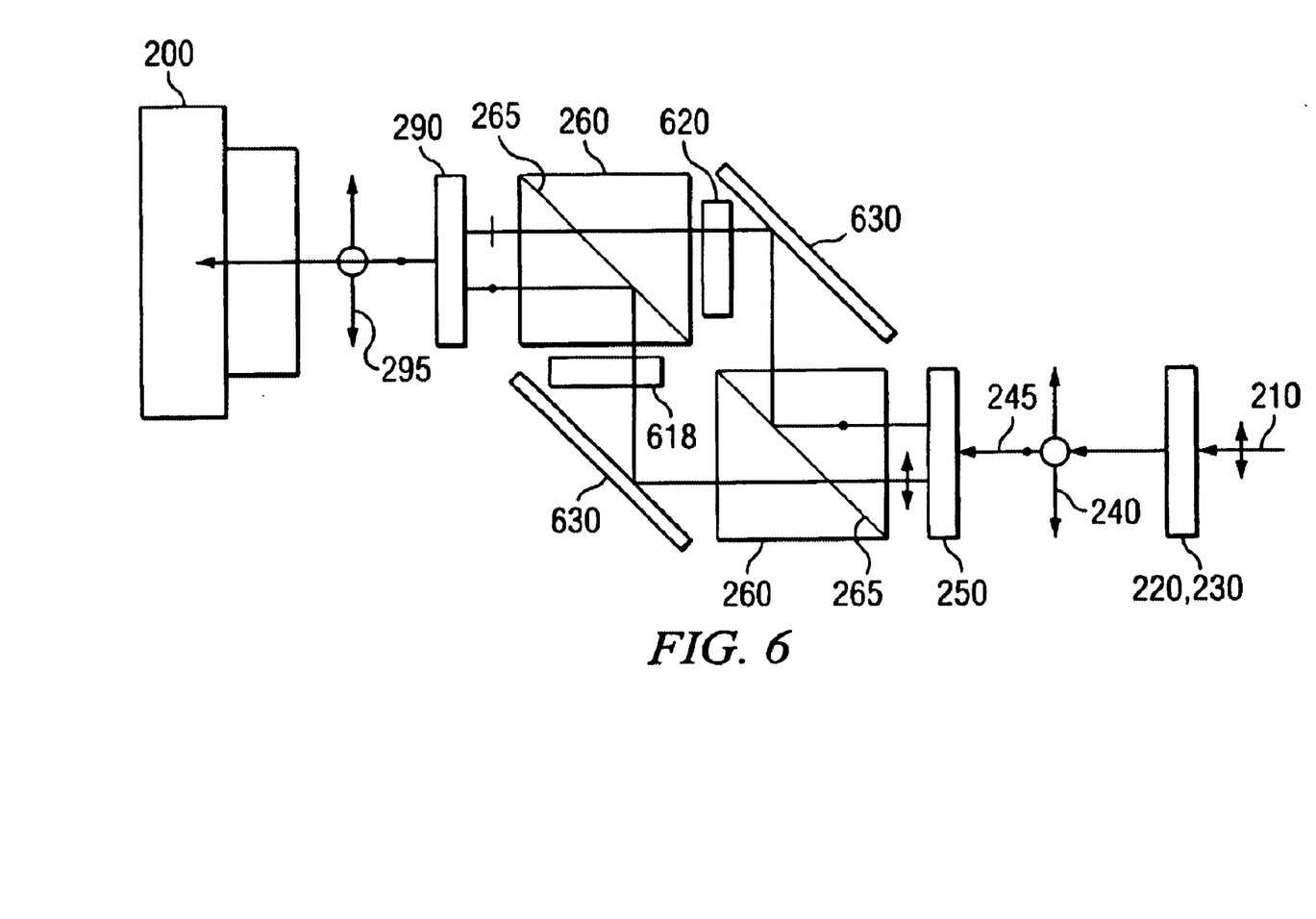
FIG. 6 is a diagram that illustrates a sixth preferred embodiment of a two transmissive panel full color projection system in accordance with the present invention.

FIG. 6 is a diagram that illustrates a sixth preferred embodiment of a two panel full color projection system in accordance with the present invention. The sixth preferred embodiment concerns unfolding the architectures of the first through fifth embodiments using transmissive panels 610, 620 in the place of reflective panels with the additional use of mirrors 630 and a second PBS 260 which includes a similar single reflecting/transmitting surface 265 to the first PBS 260. An equivalent transmissive system, similar to the two panel reflective system shown in FIG. 2, is shown in FIG. 6.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A two-panel color modulation device comprising:
   a beam splitting element;
   an input polarization rotation element that rotates a first light spectrum's polarization differently than a second light spectrum's polarization;
   a chromatic polarizer optically coupled to the beamsplitting element,
   wherein the input polarization rotation element and the chromatic polarizer separate the polarization of the first light spectrum from the polarization of the second light spectrum such that the beam splitting element is operable to direct one of the first and second light spectrums in a first direction and is operable to direct the other of the first and second light spectrums in a second direction;
   a first panel which is operable to receive the one of the first and second light spectrums directed in the first direction from the beam splitting element; and
   a second panel which is operable to receive the other of the first and second light spectrums directed in the second direction from the beam splitting element,
   wherein one of the first and second panels sequentially modulates one of the first and second spectrums.

2. The apparatus of claim 1,
   wherein the chromatic polarizer is optically coupled to the input polarization rotation element and the beamsplitting element; and
   wherein the chromatic polarizer is in contact with light of the first and second spectrum prior to input into the beamsplitting element.

3. The apparatus of claim 1, wherein the chromatic polarizer polarizes the second spectrum.

4. The apparatus of claim 1, further comprising an output polarization rotation element that rotates a polarization of the first light spectrum differently than a polarization of the second light spectrum, and a dynamic filter that receives and modulates images from the output polarization rotation element.

5. The apparatus of claim 1, wherein at least one of the first and second panels is a liquid crystal on silicon panel.

6. The apparatus of claim 1,
   wherein the beam splitting element is a polarizing beam splitter;
   wherein the first light spectrum is input into the polarizing beam splitter with a first polarization; and
   wherein the second light spectrum is input into the polarizing beam splitter with a second polarization substantially orthogonal to the first polarization.

7. The apparatus of claim 6, wherein the first spectrum having the first polarization and the second polarization are produced from a single polarized input beam.

8. The apparatus of claim 7, wherein the first spectrum having the first polarization and the second spectrum having the second polarization are produced from the single polarized input beam by an input stack filter.

9. A two-panel color modulation device for modulating light comprising:
   a beam splitting element;
   an input polarization rotation element that rotates a first light spectrum's polarization differently than a second light spectrum's polarization, wherein the input polarization rotation element separates the polarization of the first light spectrum from the polarization of the second light spectrum such that the beam splitting element is operable to direct one of the first and second light spectrums in a first direction and is operable to direct the other of the first and second light spectrums in a second direction;

a first panel which is operable to receive the one of the first and second light spectrums directed in the first direction from the beam splitting element;

a second panel which is operable to receive the other of the first and second light spectrums directed in the second direction from the beam splitting element, wherein one of the first and second panels sequentially modulates one of the first and second spectrums; and an output stack filter that rotates light polarization such that light of the first and second spectrums have substantially the same polarization when combined into an image.

10. The apparatus of claim 9, further comprising a neutral polarizer in contact with light of the first and second spectrums after output from the output stack filter.

11. A two-panel color modulation device for modulating light comprising:

a beam splitting element;

an input polarization rotation element that rotates a first light spectrum's polarization differently than a second light spectrum's polarization, wherein the input polarization rotation element separates the polarization of the first light spectrum from the polarization of the second light spectrum such that the beam splitting element is operable to direct one of the first and second light spectrums in a first direction and is operable to direct the other of the first and second light spectrums in a second direction;

a first panel which is operable to receive the one of the first and second light spectrums directed in the first direction from the beam splitting element;

a second panel which is operable to receive the other of the first and second light spectrums directed in the second direction from the beam splitting element, wherein one of the first and second panels sequentially modulates one of the first and second spectrums; and an output stack filter and a neutral polarizer, or an output chromatic polarizer.

12. An apparatus according to claims 1, 9, or 11, further comprising a rotating color filter wheel.

13. An apparatus according to claims 1, 9, or 11, wherein the input polarization rotation element includes a polarization stack filter.

14. A two-panel color modulation device comprising:

a beam splitting element;

a polarization stack filter that comprises a stack of birefringent layers and at least one active liquid crystal cell;

an input polarization rotation element that rotates a first light spectrum's polarization differently than a second light spectrum's polarization, wherein the input polarization rotation element separates the polarization of the first light spectrum from the polarization of the second light spectrum such that the beam splitting element is operable to direct one of the first and second light spectrums in a first direction and is operable to direct the other of the first and second light spectrums in a second direction;

a first panel which is operable to receive the one of the first and second light spectrums directed in the first direction from the beam splitting element; and a second panel which is operable to receive the other of the first and second light spectrums directed in the second direction from the beam splitting element, wherein one of the first and second panels sequentially modulates one of the first and second spectrums.

15. An apparatus according to claims 1, 9, 11, or 14, wherein pixels of the second panel receive light of a first color in the first spectrum in a time sequential manner; and pixels of the second panel receive light of a second color in the second spectrum in a time sequential manner.

16. A two-panel color modulation device comprising:

a beam splitting element;

an input polarization rotation element that rotates a first light spectrum's polarization differently than a second light spectrum's polarization, wherein the input polarization rotation element separates the polarization of the first light spectrum from the polarization of the second light spectrum such that the beam splitting element is operable to direct one of the first and second light spectrums in a first direction and is operable to direct the other of the first and second light spectrums in a second direction;

a first panel which is operable to receive the one of the first and second light spectrums directed in the first direction from the beam splitting element;

a second panel which is operable to receive the other of the first and second light spectrums directed in the second direction from the beam splitting element, wherein one of the first and second panels sequentially modulates one of the first and second spectrums; and a dynamic filter that receives and modulates images from the first and second panels that have been combined by the beamsplitting element.

17. The apparatus of claim 16, further comprising an output polarization rotation element that rotates a polarization of the first light spectrum differently than a polarization of the second light spectrum, and another dynamic filter that receives and modulates images from the output polarization rotation element.

18. A two-panel color modulation device comprising:

a beam splitting element;

an input polarization rotation element that rotates a first light spectrum's polarization differently than a second light spectrum's polarization, wherein the input polarization rotation element separates the polarization of the first light spectrum from the polarization of the second light spectrum such that the beam splitting element is operable to direct one of the first and second light spectrums in a first direction and is operable to direct the other of the first and second light spectrums in a second direction;

a first panel which is operable to receive the one of the first and second light spectrums directed in the first direction from the beam splitting element;

a second panel which is operable to receive the other of the first and second light spectrums directed in the second direction from the beam splitting element, wherein one of the first and second panels sequentially modulates one of the first and second spectrums; and a second input polarization rotation element;

a first filter and a second filter, the first filter being optically before the beamsplitting element and the second filter being optically after the beamsplitting element; and a clean up polarizer after the beamsplitting element, wherein at least one of the input polarization rotation element and the second input polarization rotation element is dynamic and provides polarization rotation to a portion one of the first and second spectrums, and wherein the first and second filters rotate one of the first and second spectrums.

19. The apparatus of claim 18, wherein the input polarization rotation element rotates the polarization of blue light, the second input polarization rotation element rotates the polarization of green light, and the first and second filters rotate red light.

20. An apparatus according to claim 18, wherein the input polarization element and the second input polarization element are adjacent to each other.

21. An apparatus according to claim 18, wherein another element is interposed between the input polarization element and the second input polarization element.

22. An apparatus according to claims 9, 14, 16, or 18, and further comprising a chromatic polarizer optically coupled to the beam splitting element.

23. An apparatus according to claims 1, 9, 16, or 18, and further comprising a polarization stack filter that comprises a stack of birefringent layers and at least one active liquid crystal cell.

24. An apparatus according to claims 1, 9, 14, 16, or 18, wherein at least one of the first and second panels is a liquid crystal on silicon panel.

25. A sequential two-panel color modulation device comprising:

a beamsplitting element;

a first reflective panel which receives a first light spectrum from the beam splitting element;

a second reflective panel which receives a second light spectrum from the beam splitting element; and an output polarization rotation element that rotates a polarization of the first light spectrum differently than a polarization of the second light spectrum, wherein the first and second spectrums of light combined include three different primary colors, wherein one of the first and second reflective panels sequentially modulates one of the first and second spectrums, and wherein the output polarization rotation element substantially comports the polarization of the first light spectrum and the polarization of the second light spectrum.

26. The apparatus of claim 25, wherein the first and second panels manipulate light polarization to modulate pixel elements of the first and second reflective panels.

27. The apparatus of claim 25, wherein the first and second reflective panels are liquid crystal on silicon panels.

28. The apparatus of claim 25, wherein the beamsplitting element is a polarizing beamsplitter;

wherein the first light spectrum is input into the polarizing beamsplitter with a first polarization; and wherein the second light spectrum is input into the polarizing beamsplitter with a second polarization substantially orthogonal to the first polarization.

29. The apparatus of claim 28, wherein the first spectrum having the first polarization and the second spectrum having the second polarization are produced from a single polarized input beam.

30. The apparatus of claim 28, wherein the first spectrum having the first polarization and the second spectrum having the second polarization are produced from a single polarized input beam by an input stack filter.

31. The apparatus of claim 30, further comprising a chromatic polarizer optically coupled to the beamsplitting element.

32. The apparatus of claim 31, wherein the chromatic polarizer is optically coupled to the output polarization rotation element and the beamsplitting element; and wherein the chromatic polarizer is in contact with light of the first and second spectrum input into the beamsplitting element.

33. The apparatus of claim 31, wherein the chromatic polarizer polarizes the second spectrum.

34. The apparatus of claim 29, further comprising a chromatic polarizer optically coupled to the beamsplitting element.

35. The apparatus of claim 29, wherein the output polarization rotation element includes an output stack filter that rotates light polarization such that light of the first and second spectrums have substantially the same polarization when combined into an image.

36. The apparatus of claim 35, further comprising a neutral polarizer in contact with light of the first and second spectrums after output from the output stack filter.

37. The apparatus of claim 25, further comprising either an output stack filter and a neutral polarizer, or an output chromatic polarizer.

38. The apparatus of claim 25, further comprising a rotating color filter wheel.

39. The apparatus of claim 25, wherein the output polarization rotation element includes a polarization stack filter.

40. The apparatus of claim 39, wherein the stack filter comprises a stack of birefringent layers and at least one active liquid crystal cell.

41. The apparatus of claim 25, wherein pixels of the second reflective panel receive light of a first color in the first spectrum in a time sequential manner; and pixels of the second reflective panel receive light of a second color in the second spectrum in a time sequential manner.

42. The apparatus of claim 25, further comprising a dynamic filter that receives and modulates images from the first and second reflecting panels that have been combined by the beamsplitting element.

43. The apparatus of claim 42, further comprising another dynamic filter that receives and modulates images from the output polarization rotation element.

44. The apparatus of claim 25, further comprising another dynamic filter that receives and modulates images from the output polarization rotation element.

45. The apparatus of claim 25, further comprising:

a second output polarization rotation element;

a first filter and a second filter, the first filter being optically before the beamsplitting element and the second filter being optically after the beamsplitting element; and a clean up polarizer after the beamsplitting element, wherein the input polarization rotation element and a second input polarization rotation element are dynamic and provide polarization rotation to a portion of the first spectrum, and wherein said first and second filters rotate the second spectrum.

46. The apparatus of claim 45, wherein
the input polarization rotation element rotates the polarization of blue light,
the second input polarization rotation element rotates the polarization of green light, and
the first and second filters rotate red light.

47. A sequential two-panel color modulation device comprising:
a beam splitting element;
a first reflective panel which receives a first light spectrum from the beam splitting element;
a second reflective panel which receives a second light spectrum from the beam splitting element; and
an input polarization rotation element and an output polarization rotation element that rotate a polarization of the first light spectrum differently than a polarization of the second light spectrum,
wherein the first and second spectrums of light combined include three different primary colors,
wherein one of the first and second reflective panels sequentially modulates one of the first and second spectrums,
wherein the input polarization rotation element separates the polarization of the first light spectrum from the polarization of the second light spectrum such that the beam splitting element directs one of the first and second light spectrums to the first reflective panel and directs the other of the first and second light spectrums to the second reflective panel, and
wherein the output polarization rotation element substantially comports the polarization of the first light spectrum and the polarization of the second light spectrum.

48. The apparatus of claim 47, wherein the first and second panels manipulate light polarization to modulate pixel elements of the first and second reflective panels.

49. The apparatus of claim 47, wherein the first and second reflective panels are liquid crystal on silicon panels.

50. The apparatus of claim 47,
wherein the beamsplitting element is a polarizing beamsplitter;
wherein the first light spectrum is input into the polarizing beamsplitter with a first polarization; and
wherein the second light spectrum is input into the polarizing beamsplitter with a second polarization substantially orthogonal to the first polarization.

51. The apparatus of claim 50, wherein the first spectrum having the first polarization and the second spectrum having the second polarization are produced from a single polarized input beam.

52. The apparatus of claim 50, wherein the first spectrum having the first polarization and the second spectrum having the second polarization are produced from a single polarized input beam by an input stack filter.

53. The apparatus of claim 52, further comprising a chromatic polarizer optically coupled to the beamsplitting element.

54. The apparatus of claim 53,
wherein the chromatic polarizer is optically coupled to the input polarization rotation element and the beamsplitting element; and
wherein the chromatic polarizer is in contact with light of the first and second spectrum prior to input into the beamsplitting element.

55. The apparatus of claim 53, wherein the chromatic polarizer polarizes the second spectrum.

56. The apparatus of claim 51, further comprising a chromatic polarizer optically coupled to the beamsplitting element.

57. The apparatus of claim 51, wherein the output polarization rotation element includes an output stack filter that rotates light polarization such that light of the first and second spectrums have substantially the same polarization when combined into an image.

58. The apparatus of claim 57, further comprising a neutral polarizer in contact with light of the first and second spectrums after output from the output stack filter.

59. The apparatus of claim 47, further comprising either
an output stack filter and a neutral polarizer, or
an output chromatic polarizer.

60. The apparatus of claim 47, further comprising a rotating color filter wheel.

61. The apparatus of claim 47, wherein the input polarization rotation element includes a polarization stack filter.

62. The apparatus of claim 61, wherein the stack filter comprises a stack of birefringent layers and at least one active liquid crystal cell.

63. The apparatus of claim 47, wherein
pixels of the second reflective panel receive light of a first color in the first spectrum in a time sequential manner; and
pixels of the second reflective panel receive light of a second color in the second spectrum in a time sequential manner.

64. The apparatus of claim 47, further comprising a dynamic filter that receives and modulates images from the first and second reflecting panels that have been combined by the beamsplitting element.

65. The apparatus of claim 64, further comprising another dynamic filter that receives and modulates images from the input polarization rotation element.

66. The apparatus of claim 47, further comprising another dynamic filter that receives and modulates images from the input polarization rotation element.

67. The apparatus of claim 47, further comprising:
a second input polarization rotation element;
a first filter and a second filter, the first filter being optically before the beamsplitting element and the second filter being optically after the beamsplitting element; and
a clean up polarizer after the beamsplitting element,
wherein the input polarization rotation element and a second input polarization rotation element are dynamic and provide polarization rotation to a portion of the first spectrum, and
wherein said first and second filters rotate the second spectrum.

68. The apparatus of claim 67, wherein
the input polarization rotation element rotates the polarization of blue light,
the second input polarization rotation element rotates the polarization of green light, and
the first and second filters rotate red light.

69. A method for projecting a full color display from a sequential two-panel color modulation device comprising:
splitting the input light beam into first and second light beams, the first light beam including the first light spectrum and the second light beam including the second light spectrum;

modulating the first light beam to form a first modulated light beam;

modulating the second light beam such that different portions of the second spectrum are sequential displayed to form a second modulated light beam;

rotating a polarization of the first modulated light beam and rotating a polarization of the second modulated light beam rotation element by different amounts such that rotated polarization of the first modulated light beam substantially comports to the rotated polarization of the second light beam.

* * * * *